United States Patent
Yanagita

(10) Patent No.: US 7,437,058 B2
(45) Date of Patent: Oct. 14, 2008

(54) METHOD AND DEVICE FOR TRANSMITTING MATERIAL DATA

(75) Inventor: Noboru Yanagita, Kanagawa (JP)

(73) Assignee: Sony Corporation, Tokyo (JP)

( * ) Notice: Subject to any disclaimer, the term of this patent is extended or adjusted under 35 U.S.C. 154(b) by 917 days.

(21) Appl. No.: 10/471,297

(22) PCT Filed: Mar. 11, 2002

(86) PCT No.: PCT/JP02/02257

§ 371 (c)(1),
(2), (4) Date: Mar. 26, 2004

(87) PCT Pub. No.: WO02/073960

PCT Pub. Date: Sep. 19, 2002

(65) Prior Publication Data

US 2004/0156505 A1 Aug. 12, 2004

(51) Int. Cl.
*H04N 5/00* (2006.01)
*H04N 7/00* (2006.01)

(52) U.S. Cl. .................................. 386/95; 386/125

(58) Field of Classification Search .................. 386/95, 386/96, 46, 83, 124, 125, 45
See application file for complete search history.

(56) References Cited

U.S. PATENT DOCUMENTS 5,671,451 A  9/1997  Takahashi et al.
5,864,131 A * 1/1999  Wagers et al. ............ 250/206.2
7,127,079 B2 * 10/2006  Keating et al. ............... 382/100

FOREIGN PATENT DOCUMENTS

| JP | 2001-195868 | 7/2001 |
| JP | 2001-292410 | 10/2001 |
| JP | 2001-298701 | 10/2001 |

OTHER PUBLICATIONS

Wilkinson J H et al: "Tools and Techniques for Globally Unique Content Identification" SMPTE Journal, SMPTE Inc. Scarsdale, N.Y., US, vol. 109, No. 10, Oct. 2000, pp. 795-799, XP000969315 ISSN: 0036-1682.

* cited by examiner

*Primary Examiner*—Robert Chevalier
(74) *Attorney, Agent, or Firm*—Frommer Lawrence & Haug LLP; William S. Frommer; Thomas F. Presson

(57) ABSTRACT

A system and method in which position information about a position where material data were created is stored as altitude information of four bytes, longitude information of four bytes and latitude information of four bytes in the Spatial Coordinates area in UMID. Identification information identifies whether the altitude information is, a distance from the center of the earth or a distance from the surface of the earth ellipsoid, measured by a predetermined geodetic coordinate system, using each of values "A" to "F" at one digit in hexadecimal notation, and the distance from the surface of the earth ellipsoid is stated as the altitude information.

40 Claims, 12 Drawing Sheets

METHOD AND DEVICE FOR TRANSMITTING MATERIAL DATA

TECHNICAL FIELD

The present invention relates to a data transmitting apparatus and method for material data including video and audio data, and a structure of data for transmission.

BACKGROUND ART

Recently, it has been tried to add a unique identifier to each material data including video and audio data obtained by video and audio recording, etc. in order to identify the material data. Such an identifier is proposed as UMID (unique material identifier) in SMPTE (Society of Motion Picture and Television Engineers)—330M.

The above-mentioned UMID is an identifier which is to be added to material data being created and unique over the world. It will not be used in common to more than one material data. Also, a new identifier is added to a copy of material data. Even in case a complete package formed from a plurality of material data is created, UMID allows to know who owns the copyright of each material data from the complete package and thus protect the copyright for each material data. Also, UMID can be used as an effective index for searching material data including many copies thereof for original material data. Actually at a broadcast station or the like, identification of material data by UMID makes it possible to make clear which one of the material data is being used in which one of a series of processes such as recording, creation, edition, transmission and archiving, and it is made possible by linkage between metadata as additional data about video and audio data and the video and audio data by UMID to know how each material data is at the present and how it has been used.

UMID having been described above has a structure as shown in FIG. 1. As shown, UMID is an Extended UMID including a total of 64 bytes and which consists of a 32-byte Basic UMID used for identification of material data (this identification is the primary function of UMID) and a 32-byte Signature Metadata used for identifying the material data according to the contents of them.

As a simple identifier, the basic UMID can be used to identify material data (this is the primary function of UMID). However, the basic UMID is formed from random information generated for the identification of material data but does not contribute to any intuitive recognition of material data. Material data can be identified according to when, where and by whom it was created, for example, and the contents of the material data can easily be recognized intuitively. On the basis of this fact, the extended UMID format is defined by such information added as Signature Metadata to the basic UMID. Such a UMID allows to make a linkage between video and audio data and metadata about the video and audio data in order to identify the material data.

As shown in FIG. 1, the Signature Metadata in the aforementioned UMID has a 12-byte Spatial Coordinates area. In this Spatial Coordinates area, position information about where the material data were created is stored as altitude, longitude and latitude information. These pieces of position information stored in the Spatial Coordinates area are based on values measured by a global positioning system (GPS) when recording the material data, for example.

More particularly, the Spatial Coordinates area consists of data areas for 4-byte altitude information, 4-byte longitude information and 4-byte latitude information, respectively, as shown in FIG. 2. Each of these pieces of position information is given in 2-digit binary coded decimal (BCD) notation per byte. Therefore, in the Spatial Coordinates area, the altitude information can be stated with a value from 0 to 99999999 m, for example.

Definition of a position on the earth by an altitude, longitude and latitude will be described herebelow. To define a position on the earth, a reference plane will be determined and the position be defined in the reference plane since the earth's terrain is rough. Generally, an ellipsoid of revolution resembling closely the so-called geoid is regarded as representing the terrain shape. The ellipsoid of revolution is called "earth ellipsoid". A position on the earth is defined by an altitude, longitude and latitude on the basis of the earth ellipsoid.

Various earth ellipsoids have been proposed, and each of the countries defines a geodetic coordinate system and an earth ellipsoid from its own point of view. In the positioning by the aforementioned GPS, the so-called world geodetic system—84 (will be referred to as "WGS-84" hereunder) coordinate system is used as the geodetic coordinate system. The WGS-84 coordinate system is very like to the international terrestrial reference frame (ITRF) coordinate system which is currently regarded as the most accurate geodetic coordinate system. It is a coordinate system taking the earth as the center thereof as in the ITRF coordinate system.

More detail explanation will be made herebelow by assuming an earth ellipsoid EE as shown in FIG. 3 and defining the position of a point A on the basis of the earth ellipsoid EE. It should be noted that in FIG. 3, the coordinate axes of a three-dimensional orthogonal coordinate system is defined as taking the center of gravity C of the earth ellipsoid EE as the origin of the coordinate system, with the x axis being extended toward an intersection between the so-called Greenwich Meridian GMR and equator EQ, y axis being extended toward the east longitude of 90 deg. and with the z axis being extended toward the north pole. In this case, the latitude of the point A is given as an angle $\phi_{LA}$ formed between a normal line N depending vertically from the point A to the surface of the earth ellipsoid EE and equatorial plane EQS. Further, the longitude of the point A is given an angle $\phi_{LO}$ formed between the meridian MR passing through an intersection I between the normal line N and surface of the earth ellipsoid EE and the Greenwich meridian GMR. Also, the altitude of the point A is given as a distance h from the point A to the point (intersection) I. Even when the point A is actually on the earth, it is given as a negative value when it is lower than the surface of the earth ellipsoid EE. In the positioning by GPS, the altitude, longitude and latitude of an arbitrary point on the earth are determined similarly to the point A.

The altitude information stored in the Spatial Coordinates area in UMID is defined as a distance from the center of the earth. That is, in the geodetic coordinate system indicated by the earth ellipsoid EE in FIG. 3, the altitude information is stated as a distance from the center of gravity C. For easier understanding, a section, taken by the meridian MR, of the earth ellipsoid EE is assumed to be as shown in FIG. 4. As known from FIG. 4, the altitude of the point A measured by GPS is given as a distance h from the point A to the point I, while the altitude information stored in the Spatial Coordinates area is stated as a distance r from the point A to the center of gravity C.

Therefore, the apparatus which generates UMID has to convert altitude information acquired using a GPS receiver into a distance from the center of gravity of the earth before storing the altitude information into the Spatial Coordinates area. However, the altitude information stated as the distance r is not any value which can be known intuitively, and evidently it is not practical.

DISCLOSURE OF THE INVENTION

Accordingly, the present invention has an object to overcome the above-mentioned drawbacks of the related art by proposing a novel format which is upward compatible with the format of conventional UMID and can be stated by effectively using meaningful altitude information acquired from outside, and providing a data transmission apparatus and method, capable of transmitting data in the proposed format and a transmission data structure formed in the novel format.

The above object can be attained by providing a data transmitter for transmission of material data including video and audio data recorded in a recording medium, the apparatus including according to the present invention a data generating means for generating unique identification data which is to be added to each of the material data and consists of a Value area where metadata being additional data about the video and audio data is stored, a Value Length area provided before the Value area and where the data length of the metadata is stated and a Universal Label Data Key area provided before the Value Length area and where the metadata is uniquely labeled, the Value area including at least a Material Number area where there is stored a code for differentiating the material and a Spatial Coordinates area where there is stored a code indicating position information as to a position where the material data were created; and a transmitting means for transmitting the identification data. The position information about a position where the material data were created is stored as altitude information, longitude information and latitude information in the Spatial coordinates area, and the data generating means generates the identification data by stating, in a part of the altitude information stored in the Spatial Coordinates area thereof, at least identification information permitting to identify which the altitude information is, a distance from the center of the earth or a distance from the surface of the earth ellipsoid, measured by a predetermined geodetic coordinate system.

The above data transmitter according to the present invention generates and transmits the identification data having stated, in a part of the altitude information stored in the Spatial Coordinates area, at least the identification information permitting to identify which the altitude information is, a distance from the center of the earth or a distance from the surface of the earth ellipsoid, measured by the predetermined geodetic coordinate system.

Also the above object can be attained by providing a data transmitting method of transmitting material data including video and audio data recorded in a recording medium, the method including, according to the present invention, the steps of generating unique identification data which is to be added to each of the material data and consists of a Value area where metadata being additional data about the video and audio data is stored, a Value Length area provided before the Value area and where the data length of the metadata is stated, and a Universal Label Data Key area provided before the Value Length area and where the metadata is uniquely labeled, the Value area including at least a Material Number area where there is stored a code for differentiating the material and a Spatial Coordinates area where there is stored a code indicating position information as to a position where the material data were created; and transmitting the identification data. The position information about a position where the material data were created is stored as altitude information, longitude information and latitude information in the Spatial Coordinates area, and in the data generating step, there is generated the identification data by stating, in a part of the altitude information stored in the Spatial Coordinates area thereof, at least identification information permitting to identify which the altitude information is, a distance from the center of the earth or a distance from the surface of the earth ellipsoid, measured by a predetermined geodetic coordinate system.

In the above data transmitting method according to the present invention, there is generated and transmitted the identification data having stated, in a part of the altitude information stored in the Spatial Coordinates area, at least the identification information permitting to identify which the altitude information is, a distance from the center of the earth or a distance from the surface of the earth ellipsoid, measured using the predetermined geodetic coordinate system.

Also the above object can be attained by providing a transmission data structure destined for transmission of unique identification data added to each of material data including video and audio data recorded in a recording medium, the identification data including, according to the present invention a Value area where metadata being additional data about the video and audio data is stored, a Value Length area provided before the Value area and where the data length of the metadata is stated and a Universal Label Data Key area provided before the Value Length area and where the metadata is uniquely labeled, the Value area including at least a Material Number area where there is stored a code for differentiating the material and a Spatial Coordinates area where there is stored a code indicating position information as to a position where the material data were created. The position information about a position where the material data were created is stored as altitude information, longitude information and latitude information in the Spatial Coordinates area, and in a part of the altitude information stored in the Spatial Coordinates area thereof, there is stated at least identification information permitting to identify which the altitude information is, a distance from the center of the earth or a distance from the surface of the earth ellipsoid, measured by a predetermined geodetic coordinate system.

In the above transmission data structure according to the present invention, there is stated, in a part of the altitude information stored in the Spatial Coordinates area, at least the identification information permitting to identify which the altitude information is, a distance from the center of the earth or a distance from the surface of the earth ellipsoid, measured using the predetermined geodetic coordinate system.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIGS. 8A, 8B and 8C explain together positioning of different subjects in order to explain the meaning of the lower four bits of the fourth byte where there is stated altitude information stored in the Spatial Coordinates area, in which FIG. 8A shows imaging of material data and recording of the material data to a recording medium on the spot, FIG. 8B shows imaging of material data, transmission of the material data and recording of the material data to a recording medium, and FIG. 8C shows imaging of a subject by a video/audio recording device being moved and recording of the subject image to a recording medium.

BEST MODE FOR CARRYING OUT THE INVENTION

Preferred embodiments of the data transmitting method and apparatus for material data including video and audio data, and the structure of data to be transmitted, according to the present invention will be described below in detail with reference to the accompanying drawings.

In this embodiment of the data transmitter which generates and transmit the identifier proposed as UMID (unique material identifier) in SMPTE (Society of Motion Picture and Television Engineers)—330M as identifier data for each of material data including video and audio data acquired by imaging and recording, position information about a position where the material data have been created is stored and transmitted in an extended UMID format.

Figure 1:
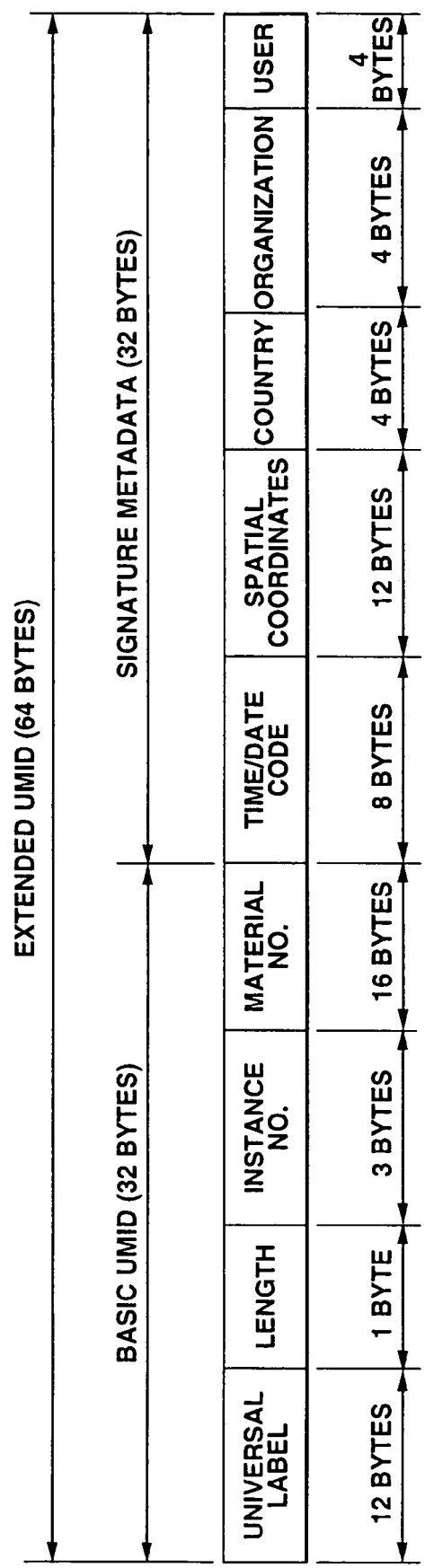
FIG. 1 shows the data structure of UMID.
Figure 2:
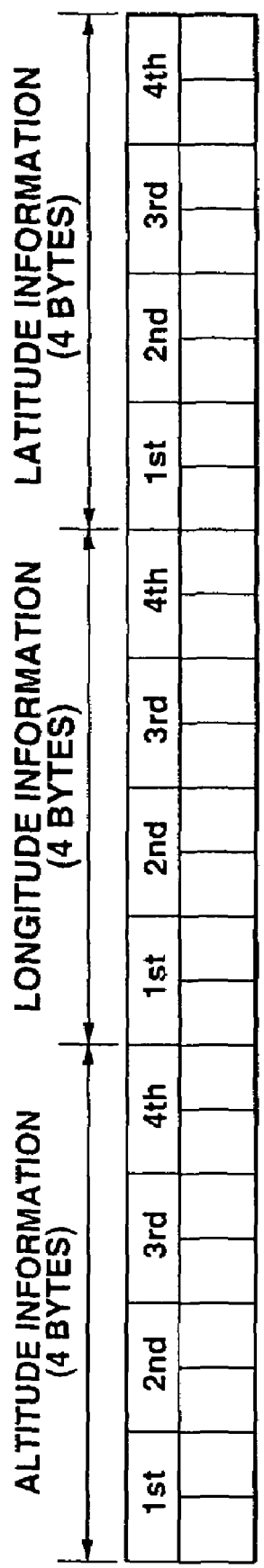
FIG. 2 shows the data structure in the Spatial Coordinates area.
Figure 3:
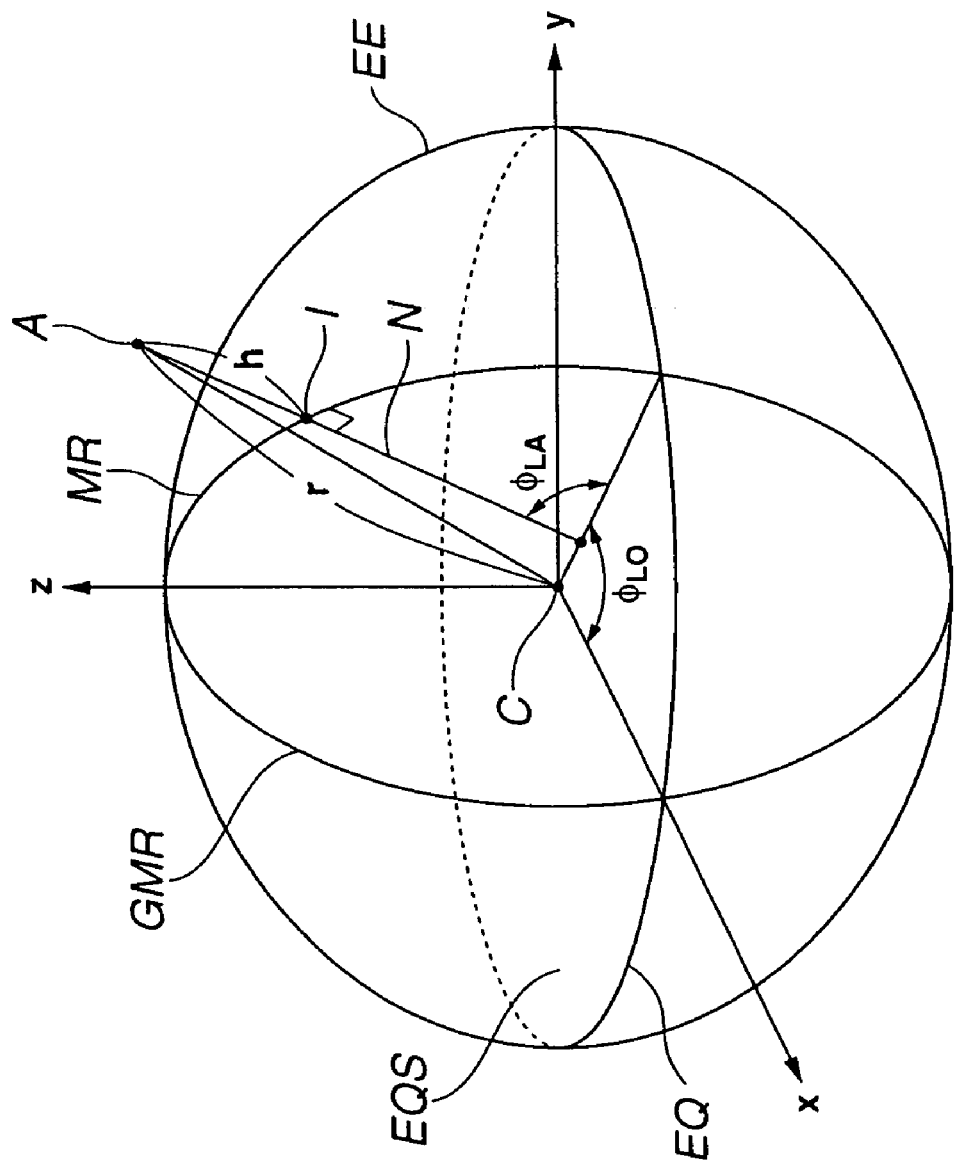
FIG. 3 explains the earth ellipsoid.
Figure 4:
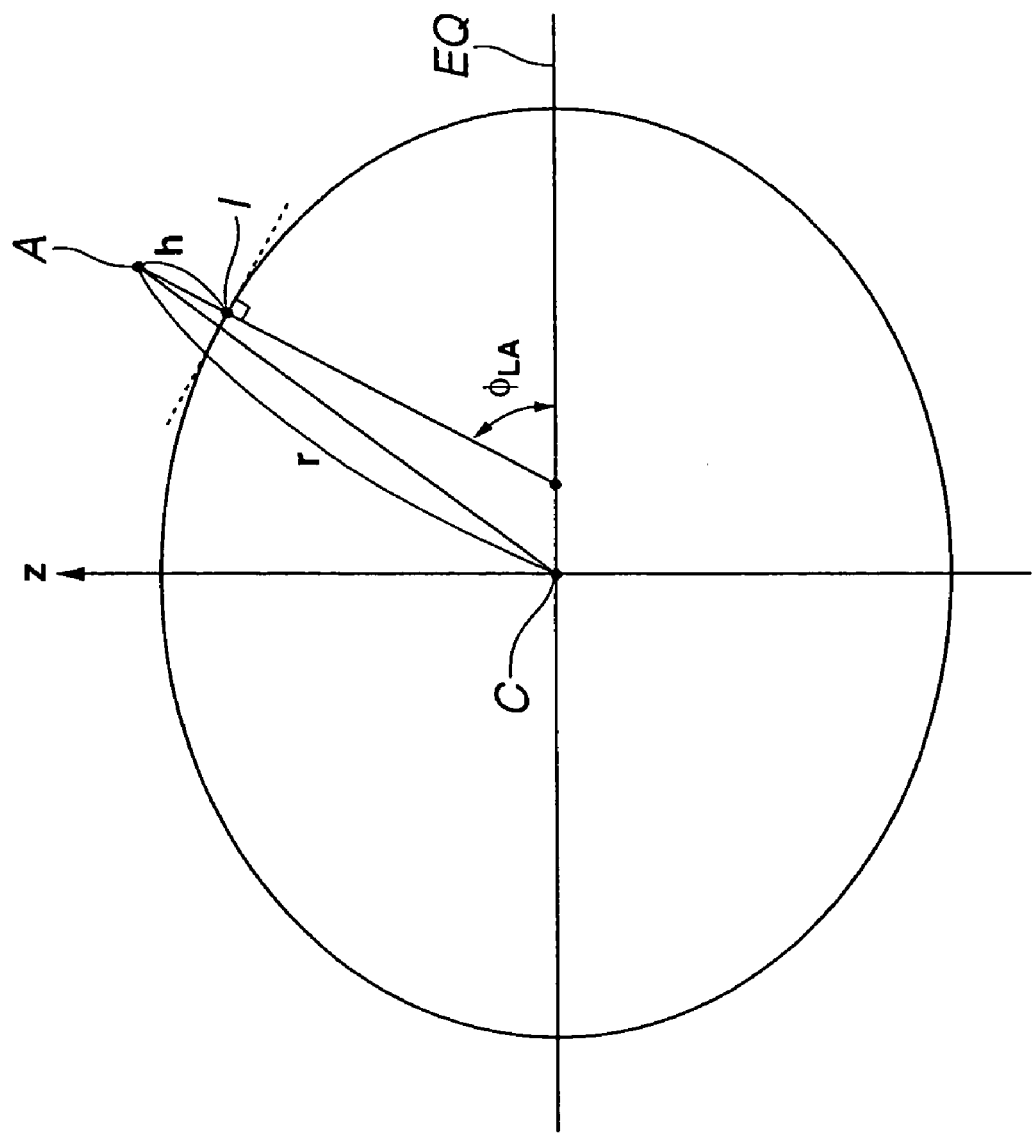
FIG. 4 explains a section, taken along the meridian, of the earth ellipsoid.
Figure 5:
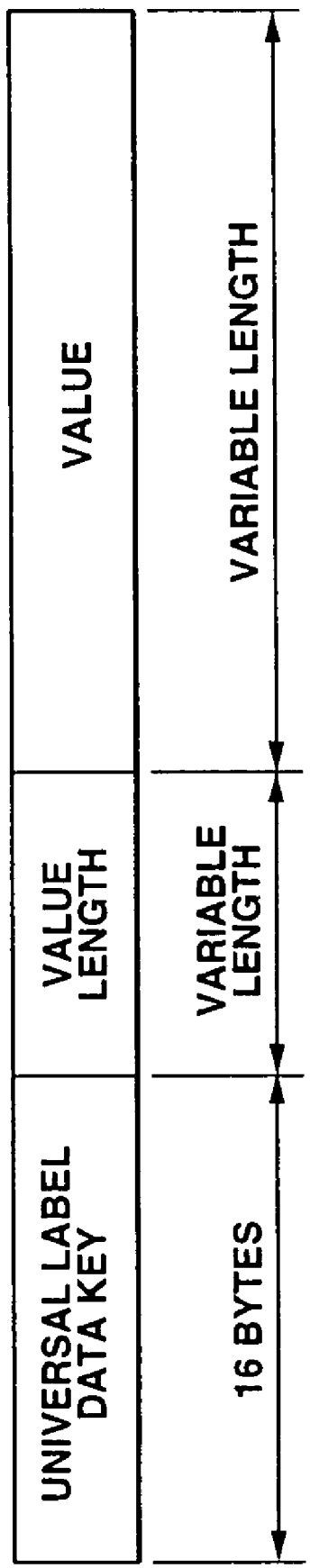
FIG. 5 shows the data structure of KLV format.

First, the novel UMID format will be described prior to the explanation of the data transmitter. UMID has a format complying with the key length value (KLV) protocol based on the SMPTE standard. The KLV format consists of a 16-byte Universal Label Data Key area, variable-length Value Length area and a variable-length Value area as shown in FIG. 5.

In the Universal Label Data Key area, there is stated Universal Label data. More specifically, in the Universal Label data area, metadata being additional data about the video and audio data in data stored in the Value area is uniquely labeled. The Universal Label Data Key area consists of a UL header area including a 1-byte subject ID (identifier) and 1-byte Universal Label size, a Universal Label designators area including a 1-byte Universal Label code, 1-byte SMPTE design, 1-byte registry design, 1-byte data design and a reference version, and a 9-byte data element tag area. In the Value Length area, there is stated the length of metadata stored in the Value area. The Value area stores metadata corresponding to the so-called SMPTE dictionary.

Figure 6:
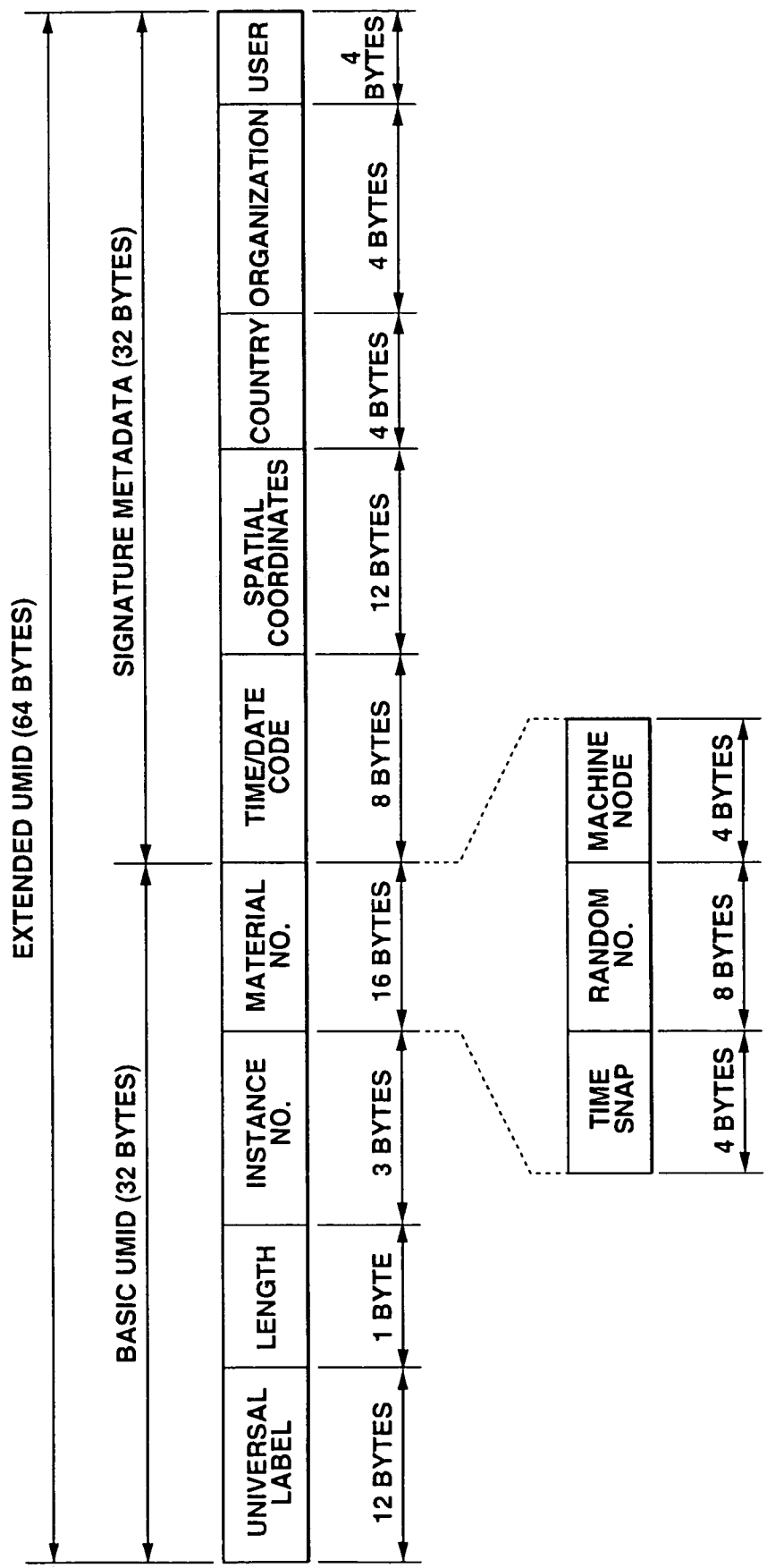
FIG. 6 shows the data structure of UMID.

UMID complying with the KLV protocol is formed as an extended UMID of 64 bytes in total including 32-bytes basic UMID used for identification of material data (this function is intrinsic to UMID) and 32-byte Signature Metadata as shown in FIG. 6.

The basic UMID consists of a 12-byte Universal Label area, 1-byte length area, 3-byte Instance Number area and a 16-byte Material Number area.

The Universal Label area stores codes for identification of data types. The universal area is referred in detail to SMPTE-298M. More specifically, the Universal Label area stores a code for UMID. The length area stores a code indicating a data length. More particularly, the length area stores "13h" for the basic UMID or "33h" for the extended UMID. The Instance Number area stores a code indicating whether the material data have been overwritten, edited or otherwise processed. The Material Number area stores a code for differentiating the material data. This area includes a 4-byte Time Snap, 8-byte Random Number and a 4-byte Machine Node.

The Time Snap indicates a number of snap clock samples per day, which indicates a time at which the material data were created in units of a clock. The Random Number is a code which prevents any redundant number from being assigned when an inaccurate time has been set or when an apparatus address in a network as defined in IEEE (Institute of Electrical and Electronics Engineers) for example has changed. The Machine Node indicates an apparatus in a network.

The Signature Metadata consists of an 8-byte Time/Date Code area, 12-byte Spatial Coordinates area, 4-byte Country area, 4-byte Organization area, and a 4-byte User area.

The Time/Date Code area stores a code for differentiation of a time and date when the material data were created. The Spatial Coordinates area stores a code indicating position information about a position where the material data were created. In the Country area, there is defined the name of a country in an abbreviated form by letters such as alphabets and symbols. In the Organization area, there is defined the name of an organization in an abbreviated form by letters such as alphabets and symbols. In the User area, there is defined the name of a user having created the material data in an abbreviated form by letters such as alphabets and symbols.

Such an extended UMID format does not include any metadata indicating an image size, generation number, etc. Especially, the Material Number area in the Basic UMID does not store any other information about the state of the material data and video data in the material data. The metadata about the image size, generation number, etc. will be transmitted in a KLV format. Data n the extended UMID format is created by, and transmitted from, a recording device which creates and records video and audio data and metadata about these material data.

Figure 7:
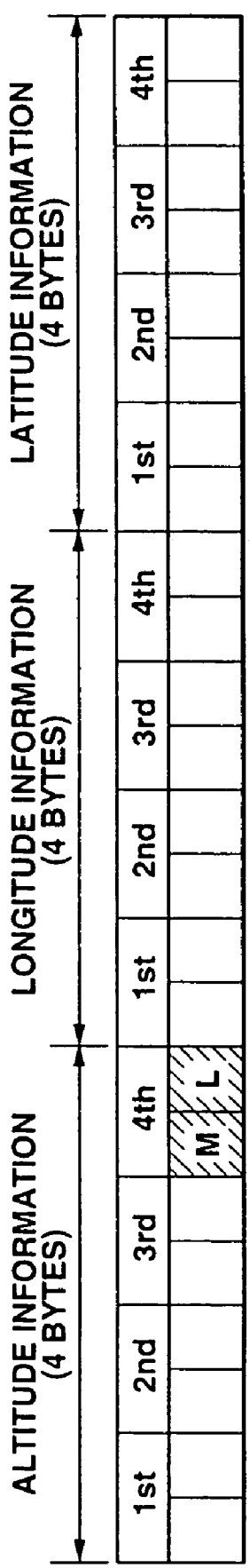
FIG. 7 shows the data structure in the special coordinates area.

As shown in FIG. 7, position information about a position where the material data are stored as altitude, longitude and latitude information each of four bytes in the Spatial Coordinates area in the UMID. These pieces of position information are based on values measured by the GPS system, for example, at the time of recording the material data. Each of the altitude, longitude and latitude information is given in 2-digit binary coded decimal (BCD) notation at each byte.

It is taken here into account that one digit is composed of four bits, namely, that one digit can represent values "0" to "15" in decimal natation. In altitude, longitude and latitude information stored in the Spatial Coordinates area in the conventional UMID format, one digit represents values "0" to "9" in decimal notation. So, values "10" to "15", namely, values "A" to "F" in hexadecimal notation, are not used in the conventional UMID format. On the other hand, the new format according to the present invention is extended using values "A" to "F" in hexadecimal notation for each digit to enable a statement of a distance from the surface of the earth ellipsoid, measured using a predetermined geodetic coordinate system, as altitude information, and in a part of the altitude information in this format, there can be stated at least identification information which permits to identify which the altitude information is, a distance from the center of the earth or a distance from the surface of the earth ellipsoid, measured using the predetermined geodetic coordinate system. That is, the new format included in the present invention is extended to state GPS-acquired altitude information as it is, and in the extended format, there can be stated at least identification information which permits to identify which the altitude information is, a distance from the center of the earth or a distance from the surface of the earth ellipsoid, measured by GPS using the so-called WGS-84 coordinate system.

More specifically, in the new format according to the present invention, values "0" to "9" in BCD notation will be stated for the first to third bytes of the four bytes stating altitude information as in the conventional UMID format as in FIG. 7. The fourth byte shown hatched in FIG. 7 is divided into two groups: upper four bits M and lower four bits L, and each group is stated as identification information using values "0" to "F" in hexadecimal notation. The meanings of the upper four bits M and lower four bits L are defined as shown in Tables 1 and 2.

TABLE 1

| Value | Meaning |
|---|---|
| 0-9 | From center of the Earth |
| A | All spatial coordinates value are manually input. |
| B | Measured by using GPS. Altitude from WGS-84 reference frame. No valid. |
| C | Measured by using GPS. Altitude from WGS-84 reference frame. Capture 2 satellites. |
| D | Measured by using GPS. Altitude from WGS-84 reference frame. Capture 3 satellites. |
| E | Measured by using GPS. Altitude from WGS-84 reference frame. Capture over 4 satellites. |
| F | Measured by using GPS. Altitude from WGS-84 reference frame. D-GPS. |

TABLE 2

| Value | Meaning |
|---|---|
| 0-9 | From center of the Earth. |
| A | Means sign plus (+) from WGS-84 reference frame. Measured at recording device. |
| B | Means sign plus (+) from WGS-84 reference frame. Measured at external device. e.g. Source from Line Feeds. |
| C | Means sign plus (+) from WGS-84 reference frame. Measured at external device: shot target. |
| D | Means sign minus (−) from WGS-84 reference frame. Measured at recording device. |
| E | Means sign minus (−) from WGS-84 reference frame. Measured at external device. e.g. Source from Line Feeds. |
| F | Means sign minus (−) from WGS-84 reference frame. Measured at external device: shot target. |

As known from Tables above, in the new format according to the present invention, a method having been used to acquire altitude information stored in the Spatial Coordinates area is assigned to the upper four bits M while plus or minus sign of the altitude information stored in the Spatial Coordinates area and a subject having been positioned are assigned to the lower four bytes L.

More particularly, in case the upper four bits M define a value between "0" and "9", altitude information stored in the Spatial Coordinates area is a distance from the center of the earth and it is stated with the first to fourth bytes as in the conventional UMID format. Also, a value "A" defined by the upper four bits M indicates that all values of altitude information stored in the Spatial Coordinates area have been entered manually. Further, a value "B" defined by the upper four bits M indicates that altitude information stored in the Spatial Coordinates area has been obtained by GPS using the WGS-84 coordinate system. However, since the information has been acquired based on signals received from zero or one satellite, the information value is not valid. Also, a value "C" defined by the upper four bits M indicates that altitude information stored in the Spatial Coordinates area has been obtained based on signals acquired by GPS using the WGS-84 coordinate system and received from two satellites. Further, a value "D" defined by the upper four bits M indicates that altitude information has been obtained by GPS using the WGS-84 coordinate system and received from three satellites. Moreover, a value "E" defined by the upper four bits M indicates that altitude information stored in the Spatial Coordinates area has been obtained by GPS using the WGS-84 coordinate system and received from four or more satellites. Also, a value "F" defined by the upper four bits M indicates that altitude information stored in the Spatial Coordinates area has been obtained by GPS using the WGS-84 coordinate system, especially, by a differential GPS (will be referred to as "D-GPS" hereunder).

The above "D-GPS" is a system in which the same signal as received by its own GPS receiver from a satellite can also be received by a stationary base station whose position is accurately known, correction data obtained by calculating position errors at the base station be sent to the user by FM multiplexed broadcast via an FM (frequency modulation) broadcast station, and position information obtained based on the signal received by its own GPS receiver be corrected based on the correction data, thereby acquiring its own position information correctly. Compared with an independent positioning, the D-GPS system can provide data of which reliability is extremely high.

Figure 8A:
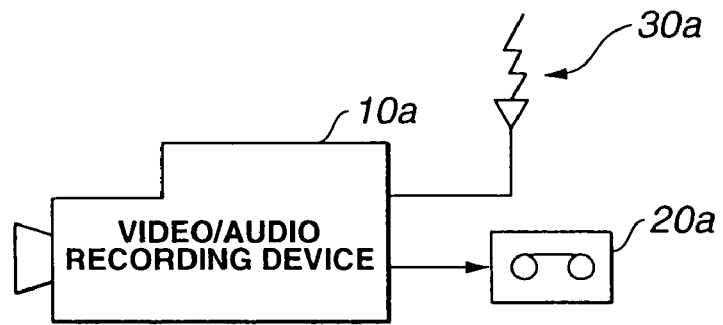
Figure 8B:
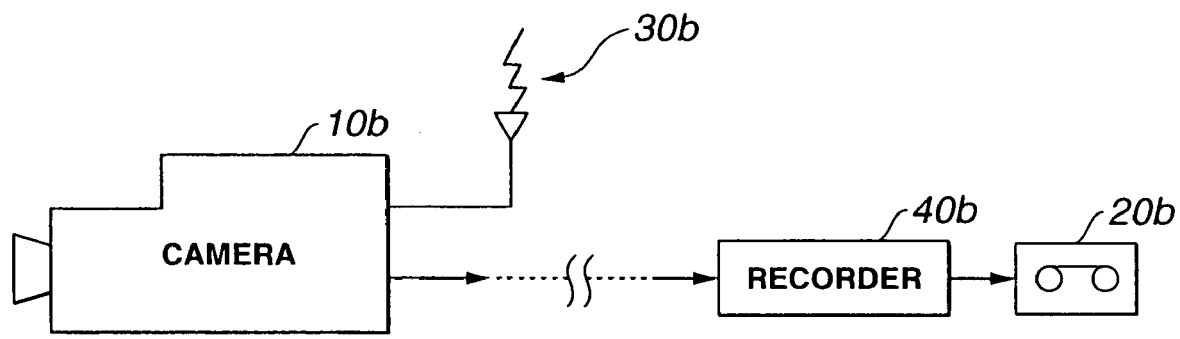
Figure 8C:
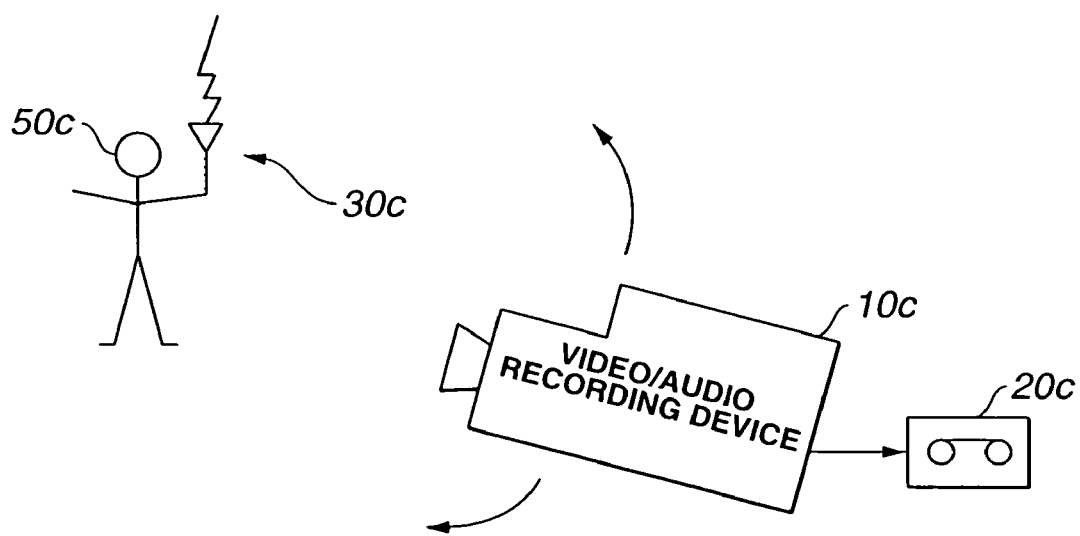

On the other hand, in case the lower four bits L define a value between "0" and "9", altitude information stored in the Spatial Coordinates area indicates a distance from the center of the earth and is stated with the first to fourth bytes as in the conventional UMID format. Also, a value "A" defined by the lower four bits L indicates that altitude information stored in the Spatial Coordinates area is positive in the WGS-84 coordinate system and it is altitude information about a recording device itself which creates and records material data including video and audio data and metadata about the video and audio data. Namely, in this case, the value "A" indicates that the altitude information stored in the-Spatial Coordinates area is altitude information about a video/audio recording device 10a, received by a GPS receiver 30a provided in the video/audio recording device (camera/recorder) 10a in a situation in which the material data including video and audio data is photographed by the video/audio recording device 10a and recorded directly to a recording medium 20a such as a tape or the like as shown in FIG. 8A for example. Further, a value "B" defined by the lower four bits L indicates that altitude information stored in the Spatial Coordinates area is positive in the WGS-84 coordinate system and it is altitude information about an external device other than any recording device. Namely, in this case, the altitude information stored in the Spatial Coordinates area is altitude information received by a GPS receiver 30b provided in a video/audio recording device 10b and it is altitude information, received by a GPS receiver 30b provided in an imaging device 40b in a situation in which material data including video and audio data is photographed by the imaging device 10b and transmitted to a removed recording device 40b such as a video tape recorder (VTR) in which the data is recorded to a recording medium 20b as shown in FIG. 8B for example. Also, a value "C" defined by the lower four bits L indicates that-altitude information stored in the Spatial Coordinates area is positive in the WGS-84 coordinate system and it is altitude information about a subject. That is, in this case, the altitude information stored in the Spatial Coordinates area is altitude information about a subject 50c, received by a GPS receiver 30c carried by the subject 50c in a situation in which the subject 50c is photographed by a video/audio recording device 10c and recorded to a recording medium 20c as shown in FIG. 8C for example. Also, a value "D" defined by the lower four bits L indicates that altitude information stored in the Spatial Coordinates area is negative in the WGS-84 coordinate system and it is altitude information about a recording device itself which creates material data from video and audio data and metadata about the video and audio data as shown in FIG. 8A for example. Further, a value "E" defined by the lower four bits L indicates that altitude information stored in the Spatial Coordinates area is negative in the WGS-84 coordinate-system and it is altitude information about an external device other than the recording device as shown in FIG. 8B for example. Also, a value "F" defined by the lower four bits L indicates that altitude information stored in the Spatial Coordinates area is negative in the WGS-84 coordinate system and it is altitude information of a subject as shown in FIG. 8C for example.

In the new format included in the present invention, altitude information which can be stated in the Spatial Coordinates area takes a value between −999999 m to +999999 m. This value range can practically cover any altitude above the earth surface. More specifically, to represent an "altitude information acquired by D-GPS positioning of a recording device at an altitude of 123 m", the first byte of the altitude information stored in the Spatial Coordinates area is stated as "0×23", second byte is as "0×01", third byte is as "0×00" and fourth byte is as "0×FA".

As above, in the new format included in the present invention, GPS-acquired information can be stated as the altitude information stored in the Spatial Coordinates area while maintaining the upward compatibility with the conventional format with a room remained for statement of a distance from the earth. Therefore, in the new format according to the present invention, the altitude information stored in the Spatial Coordinates area can be a practical value which can intuitively be grasped.

Also, in the new format according to the present invention, there can be stated, according to a value given by the upper four bits M, information about the source of the altitude information stored in the Spatial Coordinates area, namely, a statement according to the conventional UMID, manual input or GPS measurement. It should be noted that to cover a case in which position information cannot be acquired by GPS, it is stated in the new format that the altitude information stored in the Spatial Coordinates area has been manually inputted.

Further, in the new format according to the present invention, there can be stated a number of satellites having been used in positioning by GPS and from which altitude signals have been received and information indicating that the altitude information has been acquired by D-GPS. The number of satellites and information provide an index of the reliability of the altitude information. Namely, altitude information stored in the Spatial Coordinates area, acquired using a number, zero to two, of the satellites in positioning, is not reliable, but such altitude information, acquired using three or more satellites, is more reliable as the number of satellites is larger. Also, altitude information acquired using D-GPS is most reliable.

Also, in the new format, there can be stated, according to the lower four bits L, identification information about whether the attitude information stored in the Spacial Coordinates area is positive or negative and also information about a subject to be positioned, namely, which the subject is, a recording device, external device or a subject. Thus, in the case of a live feeding or satellite relaying, there can be stated in the new format information for discrimination between video and audio data acquired at a remote site and information indicating that a subject move in relation to an imaging device as in the race photography or the like.

Note that since UMID is an identifier uniquely added to each material data, position information stored in the Spatial Coordinates area may be constant for each material data but it may be varied at every predetermined time with consideration given to the fact that each of video and audio data includes a plurality of frames. In UMID, in case the location of shooting varies temporally as in a moving shot among others, variation of the position information at every predetermined time will make it easier to recognize material data.

A camera/recorder will be described as the data transmitter which transmits data in the new format included in the present invention with reference to FIG. 9. The-camera/recorder is generally indicated with a reference 100 in FIG. 9. In the following explanation, it is assumed here that the camera/recorder 100 is equipped with a GPS receiver 110 as a position information acquiring means which receives signals from satellites and acquires position information and it is included in a data transmission system.

Figure 9:
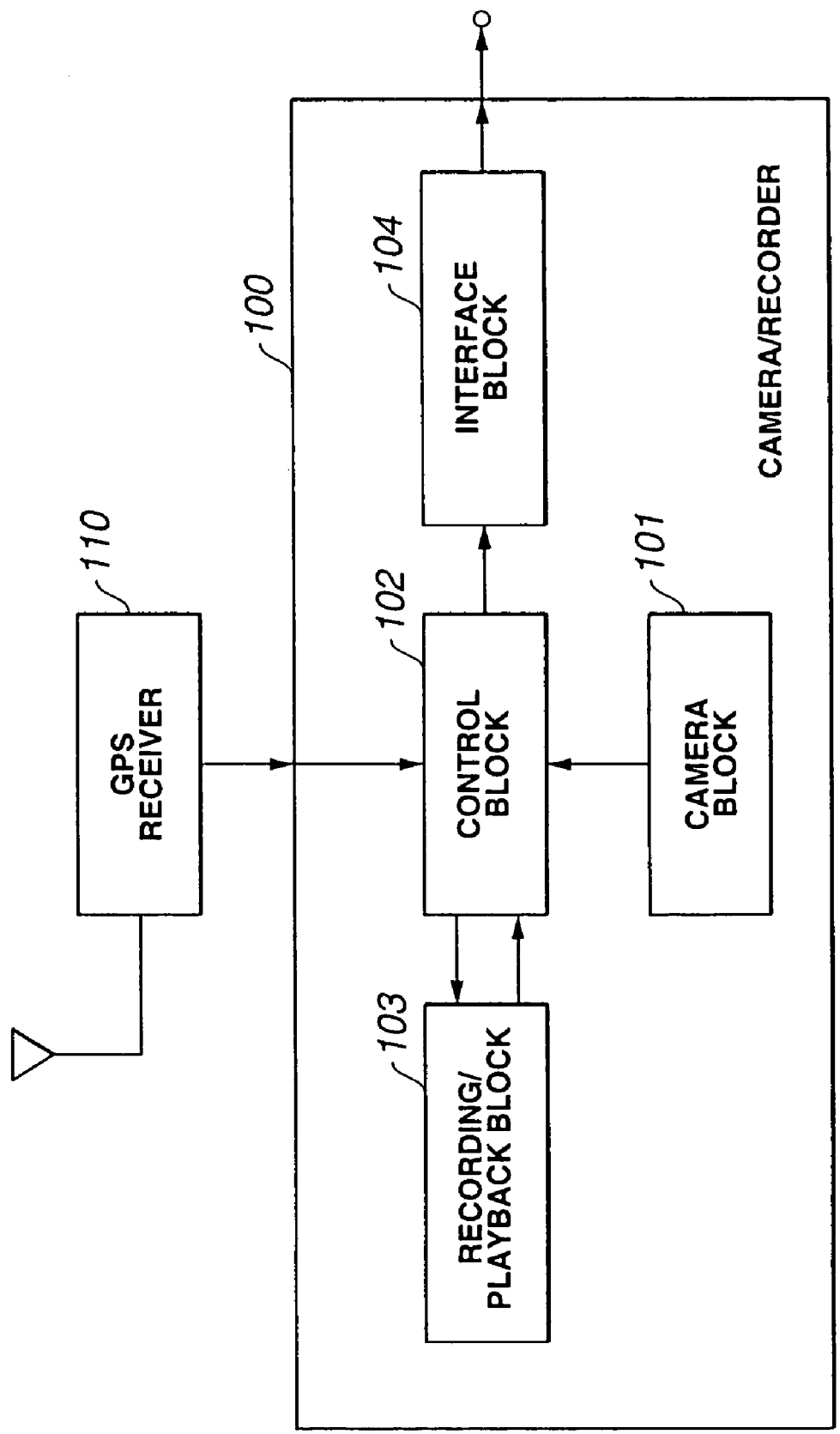
FIG. 9 is a block diagram of a data transmission system equipped with a video/audio recording device, as an embodiment of the data transmission system according to the present invention.

As shown in FIG. 9, the camera/recorder 100 includes a camera block 101 to photograph a subject, control block 102 controlling each of the system components and working as a data creating means, recording/playback block 103 to record material data to a recording medium (not shown) and reproduce the material data, and an interface block 104 to transmit the material data to outside. The camera block 101 has an optical system to photograph the subject and supplies video and audio data thus picked up to the control block 102.

The control block 102 converts video and audio data supplied from the camera block 101 into an HDCAM format corresponding to the so-called HDTV (high-definition television) for example, and supplies the converted data to the recording/playback block 103. At this time, the control block 102 is supplied with various types of metadata from outside, converts the metadata along with the video and audio data to a predetermined format, and supplies the converted metadata to the recording/playback block 103. The metadata includes ones entered by operating an input block or the like (not shown) and position information acquired via the GPS receiver 110. The control block 102 controls the recording/playback block 103 to record material data to a recording medium (not shown). Further, the control block 102 controls the recording/playback block 103 to reproduce material data recorded in the recording medium, and supplies the reproduced material data to the interface block 104. At this time, the control block 102 states and stores the metadata of the reproduced material data according to the aforementioned KLV protocol and UMID format, and supplies the metadata to the interface block 104. Especially, the control block 102 extends the aforementioned UMID for metadata about position information and states and stores the metadata according to the new format included in the present invention, thereby generating identification data. It should be noted that needless to say, the metadata about position information includes position information about the camera/recorder 100 itself, having been acquired via the GPS receiver 110, as well as position information about external device and subject.

The recording/playback block 103 is controlled by the control block 102 to record the material data supplied from the control block 102 to a recording medium (not shown). Also, the recording/playback block 103 reproduces the material data from the recording medium under the control of the control block 102, and supplies the reproduced material data to the control block 102. It should be noted that the recording medium may be either a tape-shaped one or a disk-shaped one, for example. Also, the recording medium may be a one which can be removably loaded into the recording/playback block 103 or a one which is incorporated in the recording/playback block 103.

The interface block 104 converts the material data including the video and audio data and metadata supplied from the control block 102 into a predetermined transmission format such as a serial digital interface (SDI), serial digital transport interface (SDTI) or serial digital transport interface-content package (SDTI-CP) format, each format standardized in SMPTE, and transmits the data to outside.

Figure 10:
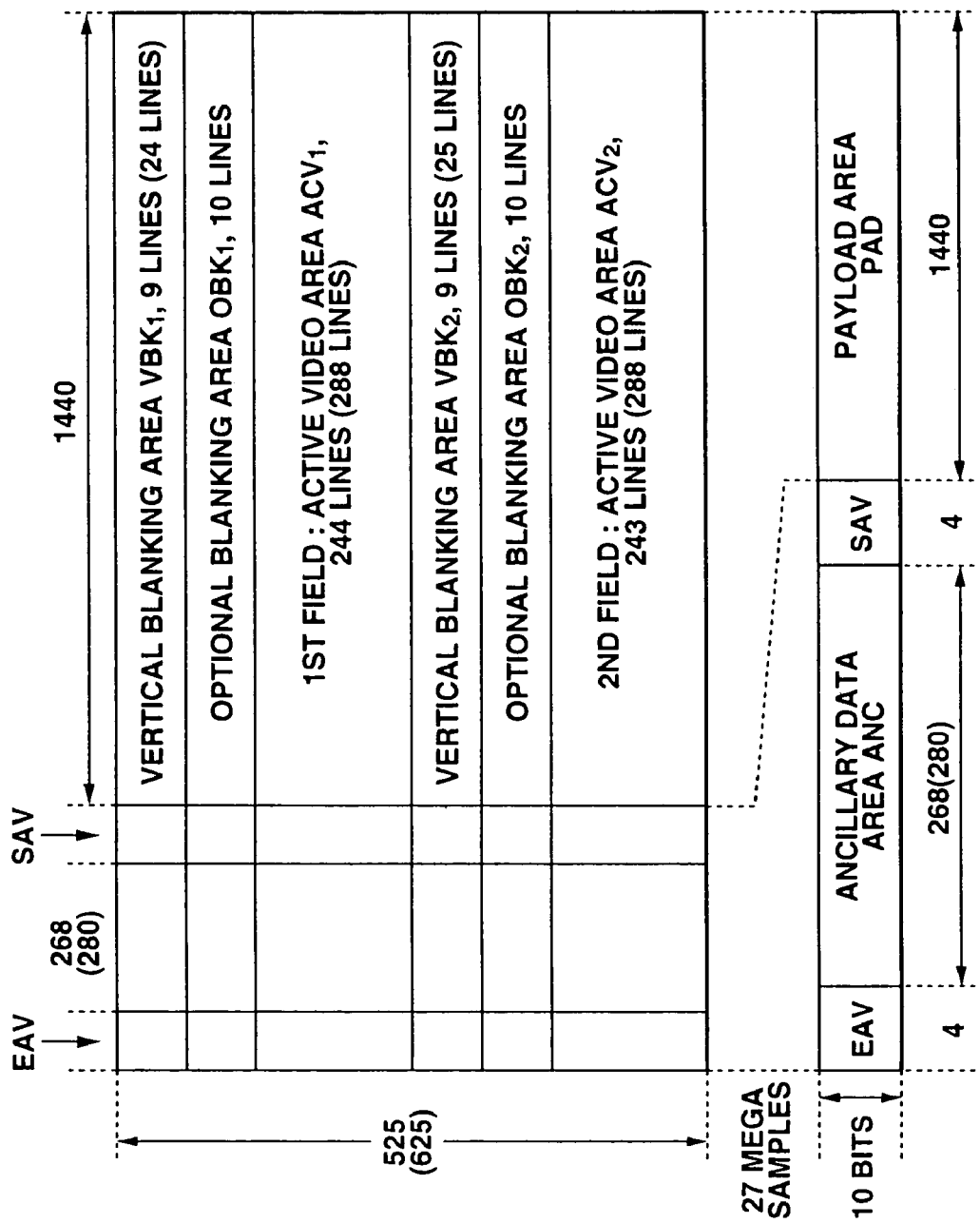
FIG. 10 shows the data structure in an SID format in one frame.

The data structure of one frame in the SDI format will be described herebelow with reference to FIG. 10. It should be noted that the upper portion of FIG. 10 shows the data structure of the entire frame and the lower portion shows the data structure of one line. In the case of the National Television System Committee (NTSC) 525 system, the SDI format consists of 1716 words, of which one word includes 10 bits per line, horizontally and 525 lines vertically as shown in FIG. 10. The SDI format defined in the NTSC system horizontally includes a 4-word EAV (end of active video) area where a sync code EAV indicating the end synchronization of the payload area (PAD area) is stored, 268-word ancillary (ANC) area were header data and auxiliary data are stored, 4-word SAV (start of active video) area where a sync code SAV indicating the start synchronization of the payload area (PAD area) is stored, and a 1440-word payload area (PAD area) where mainly video data etc. are stored, and vertically a first field being an odd-numbered field, for example, and a second field being an even-numbered field, for example, forming together one frame. Also, in the case of the phase Alternation by Line (PAL) 625 system, the SDI format in one frame consists 1728 words, of which one word includes 10 bits per line, horizontally and 625 lines vertically as shown in parentheses in FIG. 10. The SDI format defined in the PAL system horizontally includes a 4-word EAV area, 280-word ANC area, 4-word EAV area, 280-word ANC area, 4-word SAV area and a 1440-word PAD area, and vertically a first field being an odd-numbered field, for example, and a second field being an even-numbered field, for example, forming together one frame.

In the EAV area, there is stored a sync code of four words indicating the end synchronization of the PAD area. The SAV area stores a sync code of four words indicating the start synchronization of the PAD area. It should be noted that codes which will never appear in any other areas are assigned to the sync codes stored in the EAV and SAV areas. In the ANC area, there are stored mainly header data, audio data and auxiliary data. In the case of the NTSC 525 system, the PAD area includes a 24-line vertical blanking area (VBK$_1$), 10-line optional blanking area (OBK$_1$), 244-line first field active video area (ACV$_1$), 9-line vertical blanking area (VBK$_2$), 10-line optional blanking area (OBK$_2$) and a 243-line second field active video area (ACV$_2$). In the PAL 625 system, the PAD area includes a 25-line vertical blanking area (VBK$_1$), 10-line optional blanking area (OBK$_1$), 288-line first field active video area (ACV$_1$), 25-line vertical blanking area (VBK$_2$), 10-line optional blanking area (OBK$_2$) and a 288-line second field active video area (ACV$_2$). The PAD area stores mainly video data.

The SDI format is a transmission format intended for transmission of non-compressed digital data, such as the so-called D1 format or D2 format. In the camera/recorder 100, the interface block 104 stores the metadata into the ANC area. The interface block 104 makes parallel-serial conversion, and transmission-channel coding, of 10 bit-wide data having ten bits per line, and transmits the data.

Figure 11:
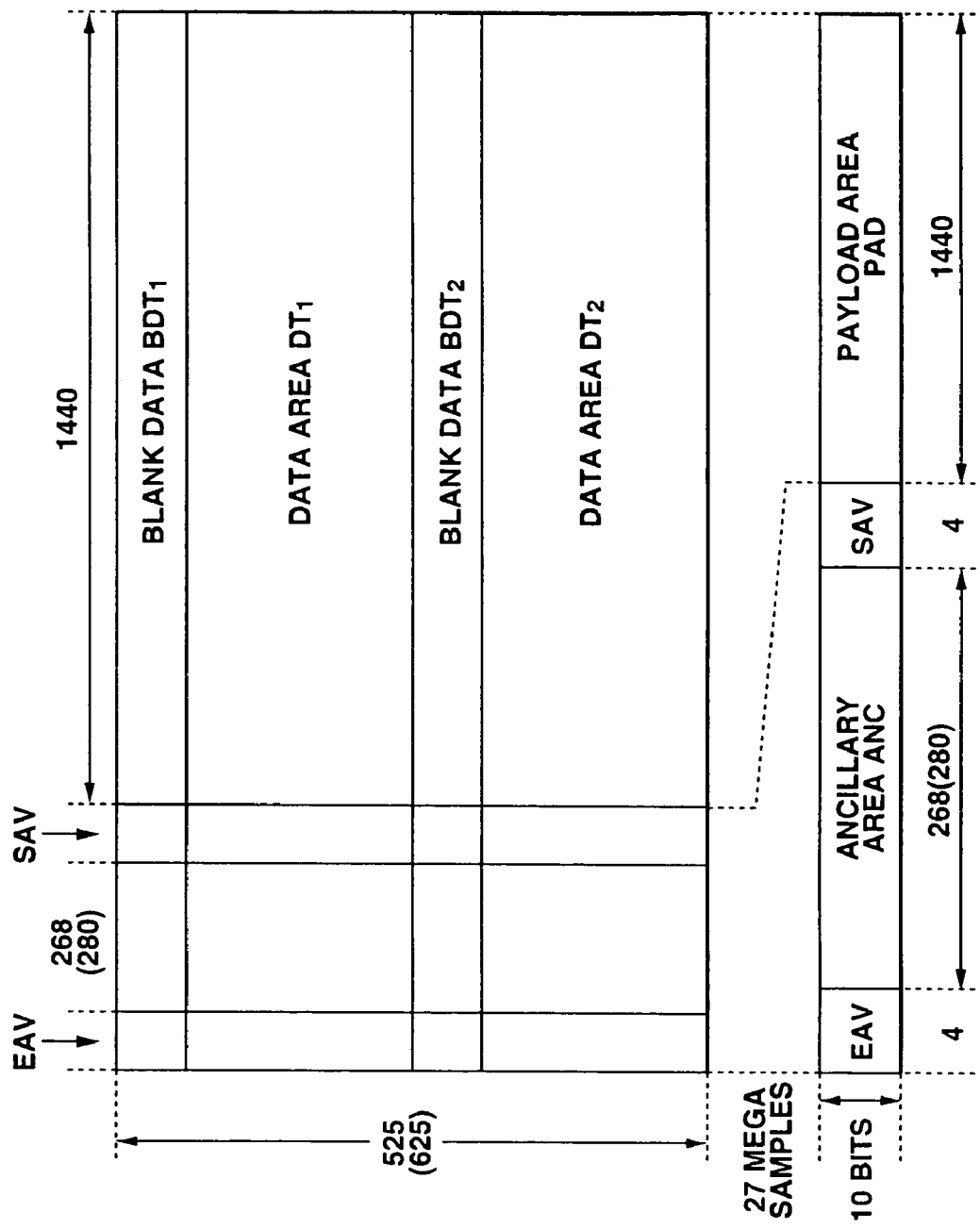
FIG. 11 shows the data structure in an SDTI format in one frame.

Next, the data structure one frame in the SDTI format will be described with reference to FIG. 11. It should be noted that the upper portion of FIG. 11 shows the data structure of the entire frame and the lower portion shows the data structure of one line. The SDTI format is similar to the SDI format. In the case of the NTSC 525 system, the SDTI format consists of 1716 words, of which one word includes 10 bits per line, horizontally and 525 lines vertically, as shown in FIG. 11. The SDTI format defined in the NTSC system horizontally includes a 4-word EAV area where a sync code EAV indicating the end synchronization of the PAD area is stored, 268-word ANC area were header data and auxiliary data are stored, 4-word SAV area where a sync code SAV indicating the start synchronization of the PAD area is stored, and a 1440-word PAD area where mainly video data etc. are stored, and vertically a first field being an odd-numbered field, for example, and a second field being an even-numbered field, for example, forming together one frame. Also, in the case of the phase Alternation by Line (PAL) 625 system, the SDTI format in one frame consists 1728 words, of which one word includes 10 bits per line, horizontally and 625 lines vertically, as shown in parentheses in FIG. 11. The SDTI format defined in the PAL system horizontally includes a 4-word EAV area, 280-word ANC area, 4-word EAV area, 280-word ANC area, 4-word SAV area and a 1440-word PAD area, and vertically a first field being an odd-numbered field, for example, and a second field being an even-numbered field, for example, forming together one frame.

The ANC area stores mainly header data, audio data and auxiliary area. Especially, in the ANC area, there is stored 53-word SDTI header data including transmission-source address, transmission-destination address, line number error detection code, etc. It should be noted that the audio data may be stored in the PAD area. In this case, the audio data will not be stored in the ANC area if not necessary. The PAD area stores mainly video data. The PAD area includes bank data areas (BDT$_1$ and BDT$_2$) and data areas (DT$_1$ and DT$_2$) but has no number of lines for each of the areas.

The SDTI format is intended mainly for an interconnection among a plurality of broadcast station-use equipment. It is standardized for transmitting compressed digital data according to the so-called Moving Picture Experts Group (MPEG) or digital video (DV) systems. In the camera/recorder 100, the interface block 104 stores metadata into a part of the ANC area where the SDTI header data is not stored. The interface block 104 makes parallel-serial conversion, and transmission-channel coding, of 10 bit-wide data having ten bits per line, and transmits the data.

Figure 12:
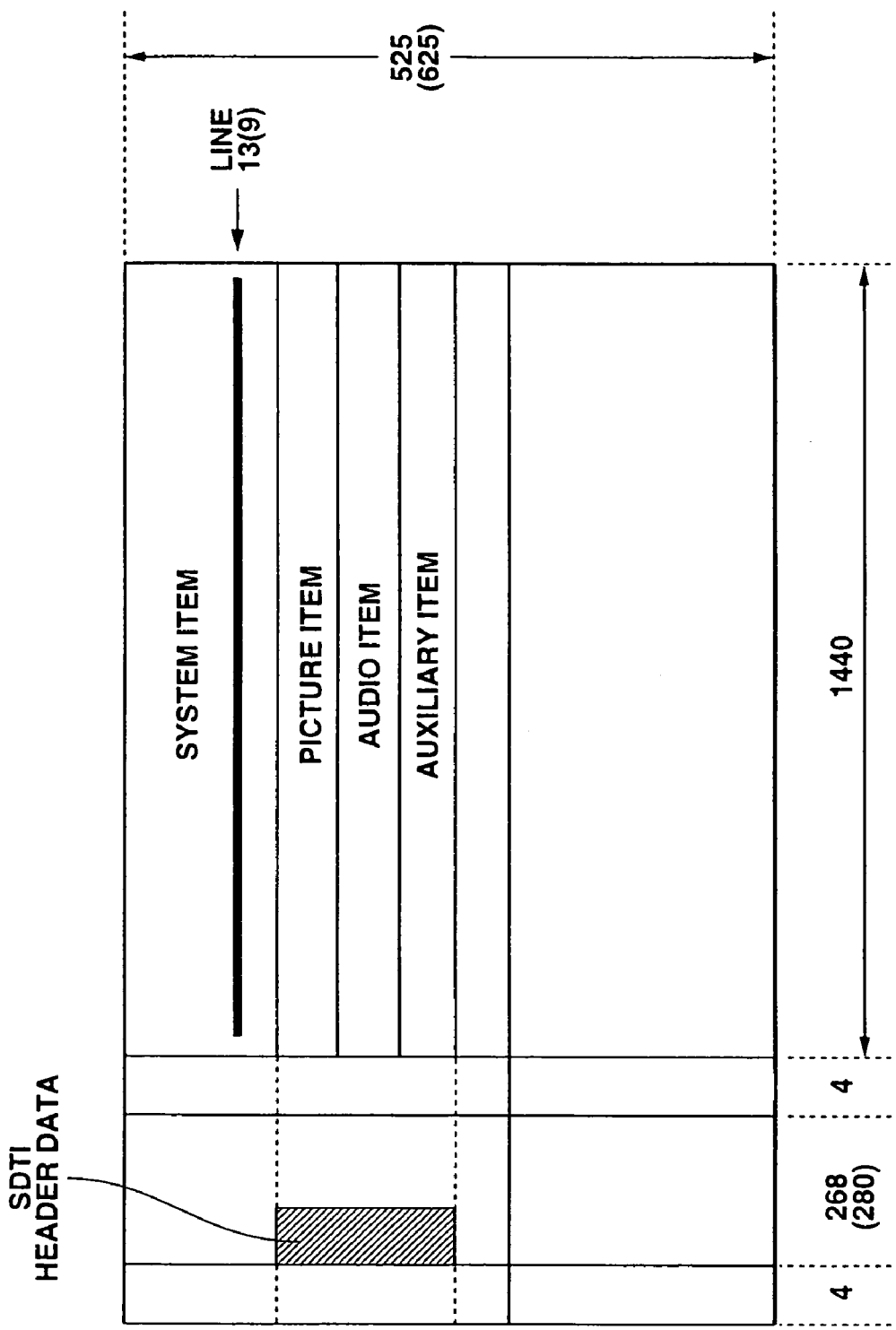
FIG. 12 shows the data structure in an SDTI-CP format in one frame.

Next, the data structure of one frame in the SDTI-CP format will be explained with reference to FIG. 12. The SDTI-CP format is a further-limited version of the SDTI format and has a PAD area configured differently from that in the SDTI format to store various kinds of data more easily. In the SDTI-CP format, data is itemized and stored into the PAD area. More specifically, the SDTI-CP format consists of a System Item, Picture Item, Audio Item and Auxiliary Item as shown in FIG. 12. The System Item further consists of a System Item Bitmap, Content Package Rate, SMPTE Universal Label, Package Metadata Set, Picture Data Set, Audio Data Set, Auxiliary Metadata Set, etc. which however are not shown.

The above SDTI-CP format permits to collectively transmit various kinds of data such as video elementary stream as defined in MPEG-2 etc. and auxiliary data including audio data and metadata. In the camera/recorder 100, the interface block 104 stores into the areas Package Metadata Set, Picture Data Set, Audio Data Set, Auxiliary Metadata Set in the System Item.

In the above camera/recorder 100, the control block 102 states and stores metadata about position information of material data read from a recording medium in the new format obtained by extending the UMID format according to the present invention, and controls the interface block 104 to convert the data into the aforementioned predetermined transmission format for transmission to outside. Thus, the camera/recorder 100 can state data by effectively utilizing meaningful information acquired as altitude information by GPS.

As having been described in the foregoing, the data transmitter as the embodiment of the present invention can create identification data having described therein GPS-acquired meaningful altitude information as the altitude information stored in the Spatial Coordinates area while maintaining the upward compatibility with the conventional format. Also, the data transmitter can create identification data having described therein a method having been used for acquisition of altitude information stated in the Spatial Coordinates area, identification information about whether the attitude information stored in the Spacial Coordinates area is positive or negative and also information about a subject to be positioned. Further, the data transmitter can create identification data having described therein a number of satellites from which GPS-acquired information has been sent and information that the position data has been acquired by D-GPS, and so it is possible to represent an index of reliability of the altitude information stored in the Spatial Coordinates area. Thus, the data transmitter capable of creating identification data which is based on the new format according to the present invention can be used by the user very conveniently.

It should be understood by those ordinarily skilled in the art that the present invention is not limited to the embodiments but identification data, for example, may freely be defined to have other meaning than the aforementioned. In the aforementioned embodiment, the data transmitter is applied to a camera/recorder used to record and create mainly material data. However, the present invention can be applied to any other apparatus than the camera/recorder, such as a server used for data edition and transmission. Namely, the present invention can be modified in various manners, constructed alternatively or embodied in various other forms without departing from the scope and spirit thereof as set forth and defined in the appended claims.

INDUSTRIAL APPLICABILITY

As having been described in detail in the foregoing, the data transmission apparatus for transmission of material data including video and audio data recorded in a recording medium comprises, according to the present invention, a data generating means for generating unique identification data which is to be added to each of the material data and consists of a Value area where metadata being additional data about the video and audio data is stored, a Value Length area provided before the Value area and where the data length of the metadata is stated and a Universal Label Data Key area provided before the Value Length area and where the metadata is uniquely labeled, the Value area including at least a Material. Number area where there is stored a code for differentiating the material and a Spatial Coordinates area where there is stored a code indicating position information as to a position where the material data were created; and a transmitting means for transmitting the identification data, the position information about a position where the material data were created being stored as altitude information, longitude information and latitude information in the Spatial Coordinates area; and the data generating means generating the identification data by stating, in a part of the altitude information stored in the Spatial Coordinates area thereof, at least identification information permitting to identify which the altitude information is, a distance from the center of the earth or a distance from the surface of the earth ellipsoid, measured by a predetermined geodetic coordinate system.

Therefore, the above data transmitter according to the present invention generates and transmits the identification data having stated, in a part of the altitude information stored in the Spatial Coordinates area, at least the identification information permitting to identify which the altitude information is, a distance from the center of the earth or a distance from the surface of the earth ellipsoid, measured using the predetermined geodetic coordinate system. So, as the altitude information stored in the Spatial Coordinates area, identification information having described therein a practical value which can intuitively be grasped can be created by effectively utilizing meaningful altitude information acquired from outside while maintaining the upward compatibility with the conventional format with a room remained for statement of a distance from the earth. Therefore, the data transmitter according to the present invention is highly convenient for the user who uses the identification data.

Also, the data transmitting method of transmitting material data including video and audio data recorded in a recording medium comprises, according to the present invention, the steps of generating unique identification data which is to be added to each of the material data and consists of a Value area where metadata being additional data about the video and audio data is stored, a Value Length area provided before the Value area and where the data length of the metadata is stated, and a Universal Label Data Key area provided before the Value Length area and where the metadata is uniquely labeled, the Value area including at least a Material Number area where there is stored a code for differentiating the material and a Spatial Coordinates area where there is stored a code indicating position information as to a position where the material data were created; and transmitting the identification data; the position information about a position where the material data were created being stored as altitude information, longitude information and latitude information in the Spatial Coordinates area; and in the data generating step, there being generated the identification data having stated, in a part of the altitude information stored in the Spatial Coordinates area thereof, at least identification information permitting to identify which the altitude information is, a distance from the center of the earth or a distance from the surface of the earth ellipsoid, measured by a predetermined geodetic coordinate system.

Therefore, the above data transmitting method according to the present invention generates and transmits the identification data having stated, in a part of the altitude information stored in the Spatial Coordinates area, at least the identification information permitting to identify which the altitude information is, a distance from the center of the earth or a distance from the surface of the earth ellipsoid, measured using the predetermined geodetic coordinate system. So, as the altitude information stored in the Spatial Coordinates area, identification information having described therein a practical value which can intuitively be grasped can be created by effectively utilizing meaningful altitude information acquired from outside while maintaining the upward compatibility with the conventional format with a room remained for statement of a distance from the earth. Therefore, the data transmitting method according to the present invention is highly convenient for the user who uses the identification data.

Further, in the transmission data structure destined for transmission of unique identification data added to each of material data including video and audio data recorded in a recording medium, the identification data comprises a Value area where metadata being additional data about the video and audio data is stored, a Value Length area provided before the Value area and where the data length of the metadata is stated and a Universal Label Data Key area provided before the Value Length area and where the metadata is uniquely labeled, the Value area including at least a Material Number area where there is stored a code for differentiating the material and a Spatial Coordinates area where there is stored a code indicating position information as to a position where the material data were created, the position information about a position where the material data were created being stored as altitude information, longitude information and latitude information in the Spatial Coordinates area; and in a part of the altitude information stored in the Spatial Coordinates area thereof, there being stated at least identification information permitting to identify which the altitude information is, a distance from the center of the earth or a distance from the surface of the earth ellipsoid, measured by a predetermined geodetic coordinate system.

Therefore, the above data structure according to the present invention has described, in a part of the altitude information stored in the Spatial Coordinates area, at least the identification information permitting to identify which the altitude information is, a distance from the center of the earth or a distance from the surface of the earth ellipsoid, measured using the predetermined geodetic coordinate system. So, as the altitude information stored in the Spatial Coordinates area, identification information having described therein a practical value which can intuitively be grasped can be created by effectively utilizing meaningful altitude information acquired from outside while maintaining the upward compatibility with the conventional format with a room remained for statement of a distance from the earth. Therefore, the data structure according to the present invention is highly convenient for the user who uses the identification data.

The invention claimed is:

1. A data transmitter for transmission of material data including video and audio data recorded in a recording medium, the apparatus comprising:
    a data generating means for generating unique identification data which is to be added to each of the material data and consists of a Value area where metadata being additional data about the video and audio data is stored, a Value Length area provided before the Value area and where the data length of the metadata is stated and a Universal Label Data Key area provided before the Value Length area and where the metadata is uniquely labeled, the Value area including at least a Material Number area where there is stored a code for differentiating the material and a Spatial Coordinates area where there is stored a code indicating position information as to a position where the material data were created; and
    a transmitting means for transmitting the identification data, the position information about a position where the material data were created being stored as altitude information, longitude information and latitude information in the Spatial Coordinates area; and
    the data generating means generating the identification data by stating, in a part of the altitude information stored in the Spatial Coordinates area thereof, at least identification information permitting to identify which the altitude information is, a distance from the center of the earth or a distance from the surface of the earth ellipsoid, measured by a predetermined geodetic coordinate system.

2. The apparatus as set forth in claim 1, wherein the data generating means generates the identification data by stating information about a positioning method used to acquire the altitude information as the identification information.

3. The apparatus as set forth in claim 2, wherein the data generating means generates the identification data by stating, as the identification information, information indicating that the altitude information has been manually entered.

4. The apparatus as set forth in claim 2, wherein the data generating means generates the identification data by stating, as the identification information, information indicating that the altitude information has been acquired by a GPS.

5. The apparatus as set forth in claim 4, wherein the data generating means generates the identification data by stating, as the identification information, information indicating a number of satellites used for acquisition of the altitude information and from which altitude signals have been received.

6. The apparatus as set forth in claim 4, wherein the data generating means generates the identification data by stating, as the identification information, information indicating that the altitude information has been acquired by a differential GPS.

7. The apparatus as set forth in claim 1, wherein the data generating means generates the identification data by stating, as the identification information, information indicating which the altitude information is, positive or negative, when the altitude information is a distance from the surface of the earth ellipsoid positioned by a predetermined geodetic coordinate system.

8. The apparatus as set forth in claim 1, wherein the data generating means generates the identification data by stating, as the identification information, information about a subject to be positioned.

9. The apparatus as set forth in claim 8, wherein the data generating means generates the identification data by stating, as the identification information, information indicating that the altitude information has been supplied from a recording apparatus which generates and records the material data.

10. The apparatus as set forth in claim 8, wherein the data generating means generates the identification data by stating, as the identification information, information indicating that the altitude information has been supplied from an external apparatus different from the recording apparatus which generates and records the material data.

11. The apparatus as set forth in claim 8, wherein the data generating means generates the identification data by stating, as the identification information, information indicating that the altitude information is about the subject.

12. The apparatus as set forth in claim 1, wherein:
    the altitude information is of four bytes; and
    the data generating means states the identification information at the fourth one of the four bytes of the altitude information.

13. The apparatus as set forth in claim 1, wherein the identification data has a Universal Label area, as the Universal Label Data Key area,
    wherein a code to identify the type of the metadata is stored, and a length area, as the Value Length area, where a code to indicate the data length of the metadata is stored.

14. The apparatus as set forth in claim 13, wherein the identification data has, as the Value area, an Instance Number area provided before the Material Number area and
wherein a code to indicate whether the material data has been processed in various manners.

15. The apparatus as set forth in claim 14, wherein the identification data has, as the Value area, a time and date code area provided before the Spatial Coordinates area and where a time and date when the material data has been created, a Country area provided after the Spatial Coordinates area and in which there is defined the name of a country in which the material data has been created, an Organization area in which there is defined the name of an organization having created the material data, and a User area in which there is defined the name of a user having created the material data.

16. The apparatus as set forth in claim 1, further comprising a reproducing means for reproducing the material data recorded in the recording medium.

17. The apparatus as set forth in claim 1, further comprising a recording means for recording the material data to the recording medium.

18. The apparatus as set forth in claim 1, further comprising a position information acquiring means for acquiring the position information from outside.

19. The apparatus as set forth in claim 1, wherein the recording medium is a tape-shaped one.

20. The apparatus as set forth in claim 1, wherein the recording medium is a disk-shaped one.

21. A data transmitting method of transmitting material data including video and audio data recorded in a recording medium, the method comprising the steps of:
generating unique identification data which is to be added to each of the material data and consists of a Value area where metadata being additional data about the video and audio data is stored, a Value Length area provided before the Value area and where the data length of the metadata is stated, and a Universal Label Data Key area provided before the Value Length area and where the metadata is uniquely labeled, the Value area including at least a Material Number area where there is stored a code for differentiating the material and a Spatial Coordinates area where there is stored a code indicating position information as to a position where the material data were created; and
transmitting the identification data;
the position information about a position where the material data were created being stored as altitude information, longitude information and latitude information in the Spatial Coordinates area; and
in the data generating step, there being generated the identification data having stated, in a part of the altitude information stored in the Spatial Coordinates area thereof, at least identification information permitting to identify which the altitude information is, a distance from the center of the earth or a distance from the surface of the earth ellipsoid, measured by a predetermined geodetic coordinate system.

22. The method as set forth in claim 21, wherein in the data generating step, the identification data is generated by stating information about a positioning method used to acquire the altitude information as the identification information.

23. The method as set forth in claim 22, wherein in the data generating step, the identification data is generated by stating, as the identification information, information indicating that the altitude information has been manually entered.

24. The method as set forth in claim 22, wherein in the data generating step, the identification data is generated by stating, as the identification information, information indicating that the altitude information has been acquired by a GPS.

25. The method as set forth in claim 24, wherein in the data generating step, the identification data is generated by stating, as the identification information, information indicating a number of satellites used for acquisition of the altitude information and from which altitude signals have been received.

26. The method as set forth in claim 24, wherein in the data generating step, the identification data is generated by stating, as the identification information, information indicating that the altitude information has been acquired by a differential GPS.

27. The method as set forth in claim 21, wherein in the data generating step, the identification data is generated by stating, as the identification information, information indicating which the altitude information is, positive or negative, when the altitude information is a distance from the surface of the earth ellipsoid positioned by a predetermined geodetic coordinate system.

28. The method as set forth in claim 21, wherein in the data generating step, the identification data is generated by stating, as the identification information, information about a subject to be positioned.

29. The method as set forth in claim 28, wherein in the data generating step, the identification data is generated by stating, as the identification information, information indicating that the altitude information has been supplied from a recording apparatus which generates and records the material data.

30. The method as set forth in claim 28, wherein in the data generating step, the identification data is generated by stating, as the identification information, information indicating that the altitude information has been supplied from an external apparatus different from the recording apparatus which generates and records the material data.

31. The method as set forth in claim 28, wherein in the data generating step, the identification data is generated by stating, as the identification information, information indicating that the altitude information is about the subject.

32. The method as set forth in claim 21, wherein:
the altitude information is of four bytes; and
in the data generating means, the identification information is stated at the fourth one of the four bytes of the altitude information.

33. The method as set forth in claim 21, wherein the identification data has a Universal Label area, as the Universal Label Data Key area, wherein a code to identify the type of the metadata is stored, and a length area, as the Value Length area, where a code to indicate the data length of the metadata is stored.

34. The method as set forth in claim 33, wherein the identification data has, as the Value area, an Instance Number area provided before the Material Number area and
wherein a code to indicate whether the material data has been processed in various manners.

35. The method as set forth in claim 34, wherein the identification data has, as the Value area, a time and date code area provided before the Spatial Coordinates area and where a time and date when the material data has been created, a Country area provided after the Spatial Coordinates area and in which there is defined the name of a country in which the material data has been created, an Organization area in which there is defined the name of an organization having created the material data, and a User area in which there is defined the name of a user having created the material data.

36. The method as set forth in claim 21, further comprising a reproducing step of reproducing the material data recorded in the recording medium.

37. The method as set forth in claim 21, further comprising a recording means for recording the material data to the recording medium.

38. The method as set forth in claim 21, further comprising a position information acquiring step of acquiring the position information from outside.

39. The method as set forth in claim 21, wherein the recording medium is a tape-shaped one.

40. The method as set forth in claim 21, wherein the recording medium is a disk-shaped one.

* * * * *

UNITED STATES PATENT AND TRADEMARK OFFICE
CERTIFICATE OF CORRECTION

PATENT NO. : 7,437,058 B2  Page 1 of 1
APPLICATION NO. : 10/471297
DATED : October 14, 2008
INVENTOR(S) : Noboru Yanagita It is certified that error appears in the above-identified patent and that said Letters Patent is hereby corrected as shown below:

Title Page, insert
--(30)        Foreign Application Priority Data

March 9, 2001      (JP)          2001-67623.--

Signed and Sealed this

Sixteenth Day of December, 2008

JON W. DUDAS
*Director of the United States Patent and Trademark Office*